(12) United States Patent
Fish

(10) Patent No.: US 10,650,063 B1
(45) Date of Patent: May 12, 2020

(54) SYSTEMS AND METHODS FOR MAKING CORRELATIONS

(71) Applicant: Robert D. Fish, Tustin, CA (US)

(72) Inventor: Robert D. Fish, Tustin, CA (US)

( * ) Notice: Subject to any disclaimer, the term of this patent is extended or adjusted under 35 U.S.C. 154(b) by 261 days.

(21) Appl. No.: 14/091,874

(22) Filed: Nov. 27, 2013

Related U.S. Application Data

(60) Provisional application No. 61/730,149, filed on Nov. 27, 2012.

(51) Int. Cl.
*G06F 16/951* (2019.01)

(52) U.S. Cl.
CPC .................................. *G06F 16/951* (2019.01)

(58) Field of Classification Search
CPC ......... G06F 17/30864; G06F 17/30696; G06F 17/30713; G06F 17/30769; G06F 17/30395; G06F 17/30646; G06F 17/30693; G06F 17/30442; G06F 17/30637; G06F 17/3064; G06F 17/30675; G06F 17/30952; G06N 99/00
USPC ................. 707/705–707, 731, 771, 828–829
See application file for complete search history.

(56) References Cited

U.S. PATENT DOCUMENTS

| | | | |
|---|---|---|---|
| 3,868,675 A * | 2/1975 | Firmin | G09G 3/24 345/56 |
| 5,251,316 A * | 10/1993 | Anick | G06F 17/30737 |
| 5,752,424 A | 5/1998 | Rosene et al. | |
| 5,809,242 A | 9/1998 | Shaw et al. | |
| 5,948,061 A | 9/1999 | Merriman et al. | |
| 6,662,177 B1 * | 12/2003 | Martino | G06F 17/30817 |
| 7,076,443 B1 | 7/2006 | Emens et al. | |
| 7,664,313 B1 * | 2/2010 | Sproat | G06F 17/212 382/154 |
| 7,752,243 B2 * | 7/2010 | Hoeber | G06F 17/3064 707/706 |
| 7,970,750 B2 * | 6/2011 | Goel | G06F 16/951 707/706 |
| 9,471,672 B1 * | 10/2016 | Walters | G06F 16/951 |
| 10,169,484 B2 * | 1/2019 | Bellville | G06F 16/90 |
| 2002/0156776 A1 * | 10/2002 | Davallou | G06F 17/3061 |
| 2002/0194166 A1 | 12/2002 | Fowler | |
| 2003/0163302 A1 | 8/2003 | Yin | |
| 2004/0015783 A1 * | 1/2004 | Lennon | G06F 16/258 715/235 |
| 2004/0093321 A1 | 5/2004 | Roustant et al. | |
| 2004/0215612 A1 * | 10/2004 | Brody | G06F 17/30637 |
| 2004/0267725 A1 | 12/2004 | Hank | |
| 2005/0004949 A1 * | 1/2005 | Trepess | G06F 17/30696 |
| 2005/0071325 A1 | 3/2005 | Bem | |
| 2005/0071328 A1 | 3/2005 | Lawrence | |
| 2005/0108001 A1 * | 5/2005 | Aarskog | G06F 17/271 704/10 |
| 2005/0154713 A1 * | 7/2005 | Glover | G06F 17/3097 |
| 2005/0187916 A1 * | 8/2005 | Levin | G06F 7/02 |
| 2005/0222989 A1 | 10/2005 | Haveliwala et al. | |
| 2005/0289100 A1 * | 12/2005 | Dettinger | G06F 17/30395 |
| 2006/0184357 A1 * | 8/2006 | Ramsey | G06F 17/275 704/9 |
| 2006/0242130 A1 | 10/2006 | Sadri et al. | |

(Continued)

*Primary Examiner* — Alex Gofman
*Assistant Examiner* — Linh Black
(74) *Attorney, Agent, or Firm* — Fish IP Law, LLP

(57) ABSTRACT

Second and higher order correlations of search terms in records of a database are located through matching of terms found in successive concordances.

15 Claims, 9 Drawing Sheets

(56) References Cited

U.S. PATENT DOCUMENTS

| | | | |
|---|---|---|---|
| 2006/0253418 A1* | 11/2006 | Charnock | G06Q 10/10 |
| 2007/0130310 A1* | 6/2007 | Batke | G05B 19/0423 |
| | | | 709/223 |
| 2007/0214132 A1 | 9/2007 | Grubb et al. | |
| 2007/0219983 A1 | 9/2007 | Fish | |
| 2008/0040324 A1 | 2/2008 | Sadri et al. | |
| 2008/0222099 A1* | 9/2008 | Morgana | G06F 17/30864 |
| 2009/0234826 A1* | 9/2009 | Bidlack | G06F 17/30489 |
| 2010/0145676 A1* | 6/2010 | Rogers | G06F 17/30905 |
| | | | 704/9 |
| 2012/0036478 A1* | 2/2012 | Boguraev | G06F 17/30684 |
| | | | 715/821 |
| 2013/0007124 A1* | 1/2013 | Sweeney | G06F 17/2785 |
| | | | 709/204 |
| 2013/0191365 A1* | 7/2013 | van Putten | G06F 17/30864 |
| | | | 707/709 |

* cited by examiner

| Search 1 | "Billy Rae" |
| Search 2 | "John Mitchell" |

FIGURE 1A

| Search 1 | "Billy Rae" |
| Search 2 | bananas |

FIGURE 1B

| Search 1 | "Billy Rae" |
| Search 2 | Princeton |
| Topic | Places, People |

FIGURE 1C

| Level 0 correlation | Joe Peterson (A1) | John Mitchell (B1) |
|---|---|---|
| Sort by:<br>☐ Alphabetical<br>☐ Occurrence<br>■ Matches<br><br>Filter by:<br>☐ Age<br>☐ Animal<br>☐ Occupation<br>☐ People<br>☐ Places<br>☐ School<br>☐ Time<br>...<br><br>Generate Next Concordance | ☐ ~~www.Stanford.edu/grads~~<br>☐ ~~www.makingbacon.com~~<br>☐ ~~www.watchout.com~~<br>☐ www.anotherwebsite.com<br>☐ www. anotherwebsite2.com<br>... | ☐ www.Stanford.edu/grads<br>☐ www.makingbacon.com<br>☐ www.watchout.com<br>☐ www.JohnsSite.com<br>☐ www.wildsite2.com<br>☐ www.onprancer.com<br>... |

FIGURE 2

| Level 1 correlation | Billy Rae (A1) | John Mitchell (B1) |
|---|---|---|
| Sort by:<br>☐ Alphabetical<br>■ Occurrence<br>☐ Matches<br><br>Filter by:<br>☐ Age<br>☐ Animal<br>☐ Occupation<br>☐ People<br>☐ Places<br>☐ School<br>☐ Time<br>...<br><br>Generate Next Concordance<br><br>Matches:<br>Stanford<br>Michael Jordon | (ConA1)<br>☐ Stanford<br>☐ Smith and Smith law firm<br>☐ pumpkin pie<br>☐ photography<br>☐ Oregon state<br>☐ Mary Golden<br>☐ Princeton High School<br>☐ Grapefruit<br>☐ ~~Michael Jordan~~<br>☐ Pinterest<br>☐ tweeting<br>... | (ConB1)<br>☐ ==========<br>☐ ==========<br>☐ ========<br>☐ ==========<br>☐ ========<br>☐ ==========<br>☐ Stanford<br>☐ ==========<br>☐ Michael Jordan<br>☐ ==========<br>☐ ========<br>... |

FIGURE 3

| Level 1 correlation | Peter Adolpho (A1) | Jack Billings (B1) |
|---|---|---|
| Sort by:<br>■ Alphabetical<br>☐ Occurrence<br>☐ Matches<br><br>Filter by:<br>☐ Age<br>☐ Animal<br>☐ Occupation<br>☐ People<br>☐ Places<br>☐ School<br>☐ Time<br>...<br><br>Generate Next Concordance<br><br>Matches:<br>Romney<br>UCLA | (ConA1)<br>☐ beef stew<br>☐ cooking<br>☐ ~~George Romney~~<br>☐ Grapefruit<br>☐ IBM<br>☐ Los Angeles<br>☐ Oregon state<br>☐ pumpkin pie<br>☐ UCLA<br>... | (ConB1)<br>☐ ==========<br>☐ ==========<br>☐ Romney<br>☐ ==========<br>☐ UCLA<br>☐ ==========<br>☐ =======<br>☐ ==========<br>☐ =======<br>... |

FIGURE 4A

| Level 1 correlation | Peter Adolpho (A1) | Jack Billings (B1) |
|---|---|---|
| Sort by:<br>☐ Alphabetical<br>☐ Occurrence<br>■ Matches<br><br>Filter by:<br>☐ Age<br>☐ Animal<br>☐ Occupation<br>☐ People<br>☐ Places<br>☐ School<br>☐ Time<br>...<br><br>Generate Next Concordance<br><br>Matches:<br>UCLA<br>Romney | (ConA1)<br>☐ ~~UCLA~~<br>☐ ~~George Romney~~<br>☐ beef stew<br>☐ pumpkin pie<br>☐ cooking<br>☐ Los Angeles<br>☐ Grapefruit<br>☐ IBM<br>☐ Oregon state<br>... | (ConB1)<br>☐ UCLA<br>☐ Romney<br>☐ ==========<br>☐ =======<br>☐ ==========<br>☐ ==========<br>☐ =======<br>☐ ==========<br>☐ =======<br>... |

FIGURE 4B

| Level 2 correlation | Mary Billings (A1) | Alfred Smith (B1) |
|---|---|---|
| Sort by:<br>☐ Alphabetical<br>■ Occurrence<br>☐ Matches<br><br>Filter by:<br>☐ Age<br>☐ Animal<br>☐ Occupation<br>☐ People<br>☐ Places<br>☐ School<br>☐ Time<br>...<br><br>Generate Next Concordance<br><br>Matches:<br>UCLA | (ConA1)<br>☐ Princeton<br>■ veterinarian<br>■ large animals<br>■ cats<br>■ dogs<br>■ neutering<br>■ spayed<br>☐ big white house<br>☐ President Obama<br>☐ Jack O'Reilly<br>☐ congress<br>...<br><br>(ConA2)<br>☐ =========<br>☐ ==========<br>☐ =======<br>☐ ==========<br>☐ =======<br>☐ UCLA<br>☐ ==========<br>... | (ConB1)<br>☐ =========<br>☐ ==========<br>☐ =======<br>☐ ==========<br>☐ =======<br>☐ ==========<br>☐ UCLA<br>☐ ==========<br>☐ =======<br>☐ ==========<br>☐ =======<br>... |

FIGURE 5A

| Level 2 correlation | Mary Billings (A1) | Eileen Flavon (B1) |
|---|---|---|
| Sort by:<br>☐ Alphabetical<br>■ Occurrence<br>☐ Matches<br><br>Filter by:<br>☐ Age<br>☐ Animal<br>☐ Occupation<br>☐ People<br>☐ Places<br>☐ School<br>☐ Time<br>...<br><br>Generate Next Concordance<br><br>Matches:<br>UCLA | (ConA1)<br>☐ Princeton<br>■ veterinarian<br>■ large animals<br>■ cats<br>■ dogs<br>■ neutering<br>■ spayed<br>☐ big white house<br>☐ President Obama<br>☐ Jack O'Reilly<br>☐ congress<br>...<br><br>(ConA2)<br>☐ ========<br>☐ =========<br>☐ ======<br>☐ =========<br>☐ =====<br>☑ UCLA<br>☐ ========<br>... | (ConB1)<br>☐ =========<br>☐ ==========<br>☐ =======<br>☐ ==========<br>☐ ======<br>☐ ==========<br>■ Alfred Smith<br>☐ ==========<br>☐ ======<br>☐ ==========<br>☐ =======<br>...<br><br>(ConB2)<br>☐ =========<br>☑ UCLA<br>☐ =======<br>☐ ========<br>☐ =========<br>☐ ==========<br>☐ =======<br>... |

FIGURE 5B

| Level 3 correlation | Mary Billings (A1) | Nancy Drew (B1) |
|---|---|---|
| Sort by:<br>☐ Alphabetical<br>■ Occurrence<br>☐ Matches<br><br>Filter by:<br>☐ Age<br>☐ Animal<br>☐ Occupation<br>■ People<br>☐ Places<br>■ School<br>☐ Time<br>...<br><br>Generate Next Concordance<br><br><br>Matches:<br>Alfred Smith<br>UCLA | (ConA1)<br>☐ George Dunkan<br>☐ President Obama<br>☐ Lilly White<br>■ Bill Gruff<br>☐ Hymat Waterson<br>☐ Nancy Billings<br>■ Drew college<br>☐ Peter Smith<br>☐ President Obama<br>☐ University of Oregon<br>☐ Tinkerbell<br>...<br><br>(ConA2)<br>■ ==========<br>■ ==========<br>■ ======<br>■ ==========<br>■ ======<br>■ Jim Moore<br>■ ==========<br>...<br><br>(ConA3)<br>☐ ==========<br>☐ ==========<br>☐ ======<br>☐ ==========<br>☑ Alfred Smith<br>☐ UCLA<br>☐ ==========<br>... | (ConB1)<br>☐ ==========<br>☐ ==========<br>☐ ======<br>☐ ==========<br>☐ ======<br>☐ ==========<br>■ Eileen Flavon<br>☐ ==========<br>☐ ======<br>☐ ==========<br>☐ ======<br>...<br><br>(ConB2)<br>☐ ==========<br>☐ Alfred Smith<br>☐ ======<br>☐ ==========<br>☐ ==========<br>☐ ==========<br>☐ ======<br>...<br><br>(ConA3)<br>☐ ==========<br>☐ ==========<br>☐ ======<br>☐ ==========<br>☐ ======<br>☐ UCLA<br>☐ ==========<br>... |

FIGURE 6

SYSTEMS AND METHODS FOR MAKING CORRELATIONS

This application claims priority to U.S. Provisional Application No. 61/730,149 filed Nov. 27, 2012. That application, as well as all other referenced extrinsic materials, is incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is database searching.

BACKGROUND

Current data search paradigms are quite good at performing trivial (level 0) correlation analyses, i.e., identifying records that contain matching terms. For example, if one searches the Internet for the string ["Joe Peterson" and "John Mitchell"], Google™, Bing™ Yahoo™ and other search engines find records that contain names of both individuals.

Level 1 correlations are much more difficult. For example, if both individuals attended UCLA, but there are no records containing both of their names, finding that correlation between the individuals could be challenging.

Level 2 and higher order correlations are even more difficult. For example, if Joe Peterson attended Stanford, where Mary Golden went to school, and Mary married John Mitchell, the correlation between Joe Peterson and John Mitchell would be extremely difficult to find using current search tools.

One of my earlier applications teaches use of concordances to facilitate searching in some circumstances, but that application does not contemplate successive (iterative) concordances. See US 2007/0219983 (Fish).

What is needed is computer systems, methods and models for assisting searchers in mining databases to identify Level 1 and higher order correlations.

SUMMARY OF THE INVENTION

The inventive subject matter provides apparatus, systems and methods in which correlations are located through matching of terms found in successive concordances.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWINGS

FIGS. 1A-1C illustrate some exemplary search interfaces and search strings.

FIG. 2 illustrates a possible output display for a level 1 correlation.

FIG. 3 illustrates another possible output display for a level 1 correlation.

FIGS. 4A-4B illustrate yet further possible output displays for level 1 correlations.

FIGS. 5A-5B illustrate possible outputs for level 2 correlations.

FIG. 6 illustrates a possible output for a level 3 correlation.

DETAILED DESCRIPTION

Figure 7:
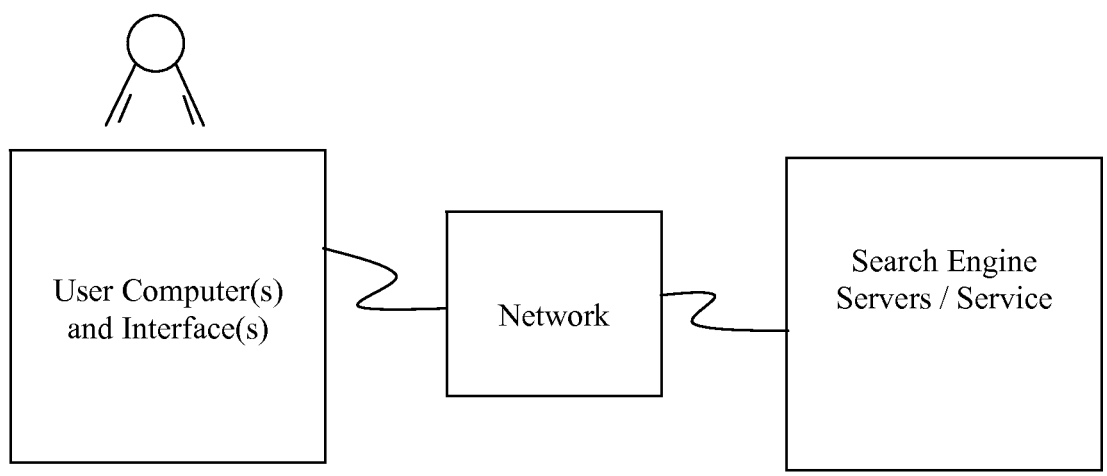
FIG. 7 is a schematic of a user working on a computer to access the processor(s) and database(s) of a search engine to perform at least some of the steps of the inventive subject matter.

It should be noted that while the following description is drawn to a computer/server based work package processing system, various alternative configurations are also deemed suitable and may employ various computing devices including servers, interfaces, systems, databases, agents, peers, engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

In FIG. 1A a search interface uses a first window on a user electronic device for a first search string and a second window, preferably on the same device, for a second search string. In this case the search strings are both names of people, and each string contains two words enclosed in quotes to force searching as to the combination. In other instances, as in FIG. 1B, the search strings could comprise other types of information besides names, could contain one, three or any other suitable numbers of terms, and could contain Boolean logic.

In FIG. 1C there are two search string windows as before, as well as a topics window, through which a user could limit the correlations. In this particular instance the user has chosen to limit the correlations to places and people.

Although the interfaces are shown here as being visual interfaces, such as might be used on a desktop, laptop or tablet, it is contemplated that one could additionally or alternatively use an auditory interface, or even some other interface.

FIG. 2 shows a possible output display for a level 1 correlation. Here the user is searching the Internet through databases of a search engine such as Google™, Bing™ or Yahoo™ for the strings "Joe Peterson" and "John Mitchell". The display shows that the system found several web pages that contain both search strings.

Readers should appreciate that all names of persons are hypothetical, and that any connection with real persons are entirely coincidental. The same is true for web URLs.

FIG. 2 also shows an optional feature by which a user can select the sort order in which the results listing is presented. In this instance, the user has selected to list the matches first. Matches can be designated in any suitable manner, including by lines (which can be solid or interrupted, with or without arrows, and so forth), by coloration, type font, size, checking relevant box(es), or in any other suitable manner.

FIG. 2 also shows an optional feature by which a user can select one or more filters. This can prove helpful where there are numerous matches, and the user wants to zero in on particular categories. Readers should appreciate that the categories shown in the figures are exemplary only, and that real life embodiments would very likely list different categories.

FIG. 3 shows a possible output display for a level 1 correlation. Here the user is searching the Internet as before, only in this case for the strings "Billy Rae" and "John Mitchell". There may or may not have been any level 1 matches, but in any event the user has chosen to have the system perform concordances for the two search strings.

The ellipses indicate that there could be many additional items in corresponding list, and the "========" markings indicate where other terms would be shown. Throughout the figures the marked boxes indicate that the user has chosen that corresponding entry.

As used herein, the term "concordance" means a collection of words or other terms used in a body of work, within a context. The context here is preferably a window of x number of words about the search term, where x can be any reasonable number. Contemplated windows can include anywhere between 10-1000 characters on one or both sides of the search terms, but more preferably between 15 and 500 characters, still more preferably between 20 and 100 characters, and most preferably between 25 and 250 characters.

The body of work can be any set of database records, which should be interpreted to include their equivalents in non-database data structures, including for example the databases mentioned above with respect to the search engine companies.

Contemplated concordances can be based on any suitable number of records within the body of work, preferably between 10 and 1000 records, more preferably between 20 and 500 records, and most preferably between 50 and 100 records.

Concordances shown to a user need not, and indeed preferably are not, complete listings of all words located within the windows of the examined records. For example, connector words such as "the", "and", "or", and "therefore", etc should be ignored. Also, one might want to ignore words that include numerals. Concordances preferably, but do not necessarily include, frequencies or numbers of occurrences. Concordances are preferably, but not necessarily, derived from windows disposed about a search term. For example, concordances could be derived from all the words in a record or other document, or perhaps only from emphasized or frequently used words and phrases. Concordances might also be derived only from main text in a record or document, perhaps ignoring advertising.

On the other hand, when constructing the concordance, phrases can advantageously be included. For example names of places and things "University of Pennsylvania" and "President Obama", can be used instead of the individual words comprising the phrase. Commercially available concordance programs already use phrases (see e.g., http:// www.concordancesoftware.co.uk/), and the various search engines should all have extensive lists of phrases that could be used. Readers will note that in the examples shown in the figures, some of the concordance terms are single words, and some are phrases.

In FIG. 3, the user has chosen to sort by frequency of occurrence of the various concordance terms, but not to filter by any of the categories.

In FIG. 3 the system has correlated Billy Rae with John Mitchell because both their names are included in web pages that include the word Stanford, and both their names are included in web pages that include the term "Michael Jordan".

FIG. 4A shows another Level 1 correlation, but in this case the search terms are "Peter Adolpho" and "Jack Billings", and the user is sorting the concordance terms alphabetically. Readers will note that correlations do not need to be exact. For example, "George Romney" is shown here as matching "Romney".

FIG. 4B shows the same Level 1 correlation as in FIG. 2, but here the user is sorting the concordance terms with matches at the top.

FIG. 5A shows a Level 2 correlation, with the concordance terms sorted by occurrence. In this case the user has triggered production of concordances from the search terms "Mary billings" and "Alfred Smith", but didn't find any correlations. In a further step the user has chosen to provide a third concordance generated from the concordance terms located using "Mary billings". That third concordance includes the term UCLA, which matches the concordance generate from the search term "Alfred Smith".

FIG. 5B shows another Level 2 correlation, and is similar to FIG. 1A in having generated three concordances. But here there was still no correlation, so the user has triggered production of a fourth concordance generated from the concordance terms located using "Alfred Smith", which was one of the terms generated in the concordance using Eileen Flavon" as the search term. Here the third and fourth concordances both the term UCLA.

FIG. 6 shows a Level 3 correlation. In this case the user triggered generation of Level 1 and Level 2 concordances, and still failed to find any correlations. But in generating the Level 3 concordances, the system shows that there is a correlation through Alfred Smith and UCLA.

FIG. 7 is a schematic of a user working on a computer to access the processor(s) and database(s) of a search engine to perform the steps discussed herein.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A service configured to assist a user to quickly and efficiently find correlations between data associated with a first search string and data associated with a second search string, the correlations extracted from within data records of a data structure, comprising a processing facility having at least one processor and configured to:
receive the first search string (A1) through a first electronic interface;
receive a second search string (B1) through a second electronic interface, wherein the first electronic interface and the second electronic interface each have graphical and auditory interface components;
determine an at least partial listing of the data records of the data structure that match A1;
determine an at least partial listing of the data records of the data structure that match B1;
provide to the user an at least partial level 1 concordance (conA1) of terms associated with A1 that are present in the at least partial listing of data records of the data structure that match A1 within a first window of up to 1,000 characters about A1,
wherein the conA1 comprises a word and a phrase, and
wherein the conA1 comprises at least one occurrence for each search term, and the at least one occurrence is derived only from main text in the data records;
provide to the user an at least partial level 1 concordance (conB1) of terms associated with B1 that are present in the at least partial listing of data records of the data structure that match B1 within a second window of up to 1,000 characters about B1,
wherein the conB1 comprises a word and a phrase, and
wherein the conB1 comprises at least one occurrence for each search term, and the at least one occurrence is derived only from main text in the data records;
receive from the user a trigger to produce at least a partial level 2 concordance (conA2) of terms that match A1 different from conA1; and
identify to the user at least a subset of matches (M1) between the conA2 and the conB1 wherein the subset of matches M1 is at least partially filtered by a designation of at least one category; and wherein the subset of matches M1 is at least partially sorted by at least one of a frequency of occurrence, a match, or alphabetically.

2. The service of claim 1, wherein the data structure comprises a database operated by or on behalf of a search engine service.

3. The service of claim 1, wherein the second electronic interface is the same as the first electronic interface.

4. The service of claim 1, wherein at least one of the first and second electronic interfaces is implemented using a microphone.

5. The service of claim 1, wherein the concordance conA1 is derived from at least 100 records of the data structure.

6. The service of claim 1, wherein the subset of matches M1 are exact matches.

7. The service of claim 1, wherein the processing facility is further configured to provide a facility by which the user can select to review a record corresponding to at least one of the at least the subset of matches.

8. The service of claim 1, wherein the processing facility is further configured to:
provide a facility by which the user can select a subset of members (A2) of the at least partial listing of conA1, and provide the at least partial level 2 concordance (conA2) of terms, wherein the at least partial 2 concordance (conA2) of terms is associated with A2 from the data records of the data structure; and
provide a facility by which the user can select a subset of members (B2) of the at least partial listing of conB1, and provide an at least partial level 2 concordance (conB2) of terms associated with B2 from the data records of the data structure.

9. The service of claim 8, wherein the processing facility is further configured to:
identify to the user at least a subset of matches (M2) between the at least partial 2 concordance (conA2) of terms and at least partial 2 concordance (conB2) of terms.

10. The service of claim 8, wherein the processing facility is further configured to:
identify to the user at least a subset of matches (M3) between the at least partial 1 concordance (conA1) of terms and the at least partial 2 concordance (conB2) of terms.

11. The service of claim 9, wherein the at least the subset of matches M2 is at least partially filtered by a designation of least one category.

12. The service of claim 8, wherein the processing facility is further configured to:
provide a facility by which the user can select a subset of members (A3) of the at least partial listing of level 2 concordance (conA2) of terms, and provide an at least partial level 3 concordance (conA3) of terms associated with A3 from the data records of the data structure; and
provide a facility by which the user can select a subset of members (B3) of the at least partial listing of level 2 concordance (conB2) of terms, and provide an at least partial level 3 concordance (conB3) of terms associated with B3 from the data records of the data structure.

13. The service of claim 12, wherein the processing facility is further configured to:
identify to the user at least a subset of matches (M4) between the at least partial 3 concordance (conA3) of terms and the at least partial 3 concordance (conB3) of terms.

14. The service of claim 12, wherein the processing facility is further configured to identify to the user at least a subset of matches (M5) between the at least partial 3 concordance (conA3) of terms and the at least partial 1 concordance (conB1) of terms, and between the at least partial 3 concordance (conA3) of terms and the at least partial 2 concordance (conB2) of terms.

15. A service configured to assist a user to find correlations between data associated with a first search string and data associated with a second search string, the correlations extracted from within data records of a data structure, comprising a processing facility having at least one processor and configured to:
receive the first search string (A1) through a first electronic interface;
receive a second search string (B1) through a second electronic interface, wherein the first electronic interface and the second electronic interface each have graphical and auditory interface components;
determine an at least partial listing of the data records of the data structure that match A1;
determine an at least partial listing of the data records of the data structure that match B1;
provide to the user an at least partial level 1 concordance (conA1) of terms associated with A1 from the at least partial listing of data records of the data structure that match A1, wherein the conA1 comprises a word and a phrase,
wherein the conA1 comprises at least one occurrence for each search term, and the at least one occurrence is derived only from main text in the data records;
provide to the user an at least partial level 1 concordance (conB1) of terms associated with B1 from the at least partial listing of data records of the data structure that match B1,
wherein the conB1 comprises a word and a phrase, and
wherein the conB1 comprises at least one occurrence for each search term, and the at least one occurrence is derived only from main text in the data records;
receive from the user a trigger to produce at least a partial level 2 concordance (conA2) of terms that match A1 different from conA1;
identify to the user at least a subset of matches (M1) between the conA2 and the conB1 with connecting lines wherein the subset of matches M1 is at least partially filtered by a designation of at least one category; and wherein the subset of matches M1 is at least partially sorted by at least one of a frequency of occurrence, a match, or alphabetically.

\* \* \* \* \*